Aug. 4, 1942.                J. W. ENGEL                2,292,109
                             BATTING CAGE
                        Filed Jan. 18, 1941          3 Sheets-Sheet 1
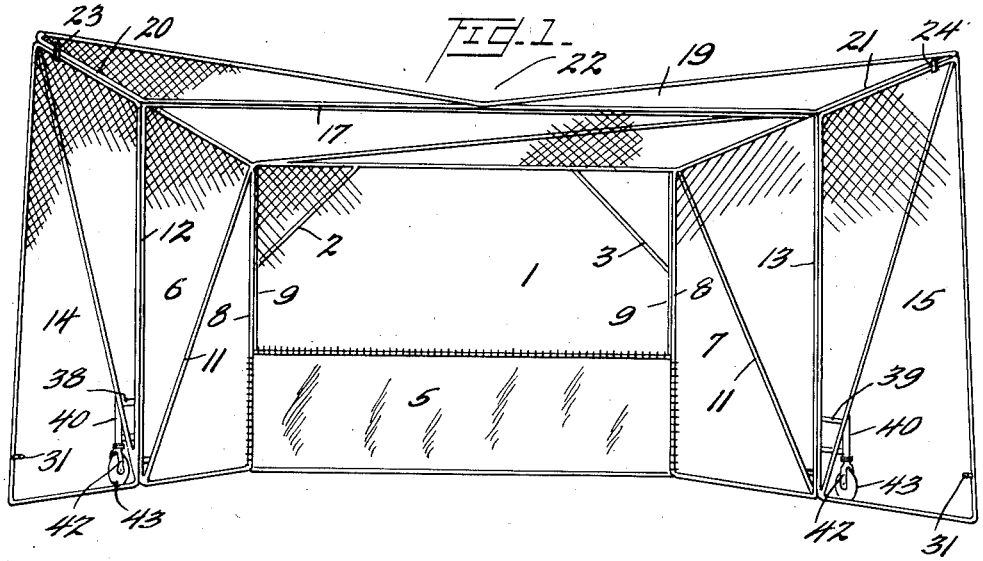
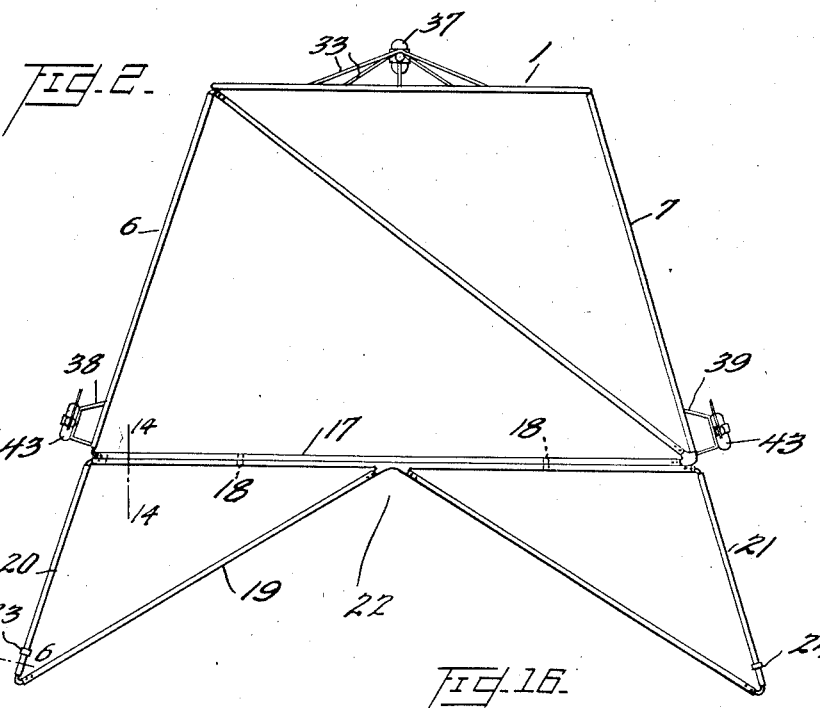
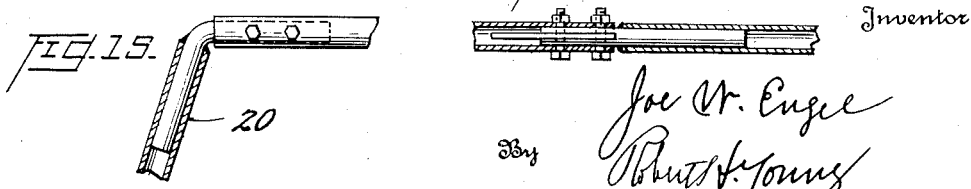
Inventor
Joe W. Engel
By Robert H. Young
Attorney Aug. 4, 1942.  J. W. ENGEL  2,292,109
BATTING CAGE
Filed Jan. 18, 1941  3 Sheets-Sheet 2
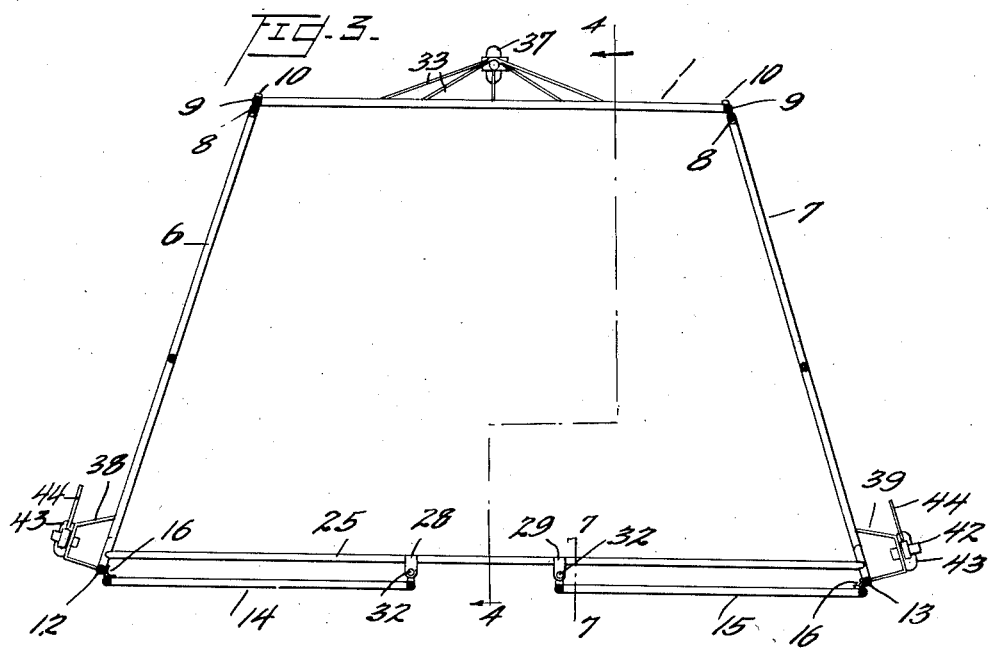
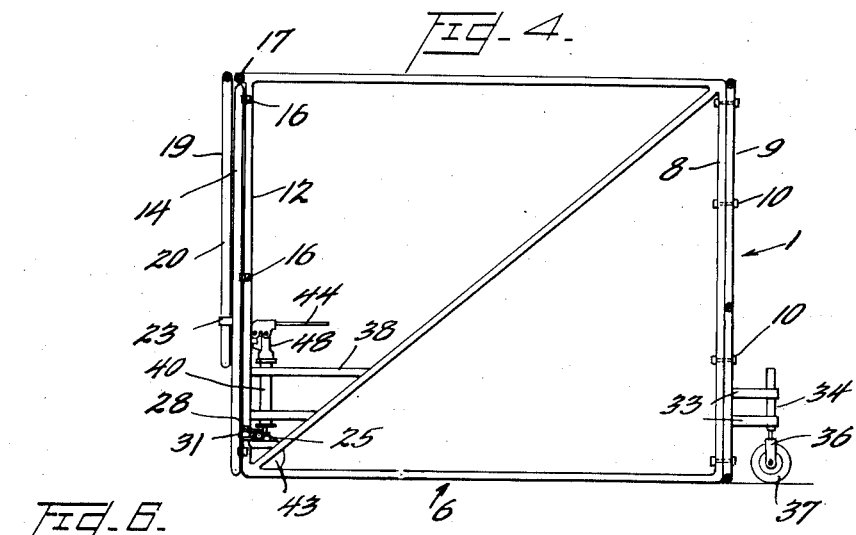
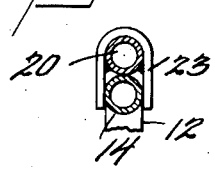
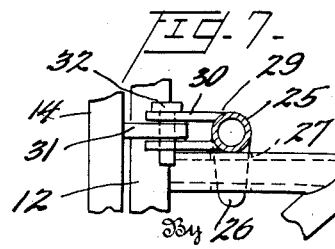
Inventor
Joe W. Engel
By Robert H. Young
Attorney

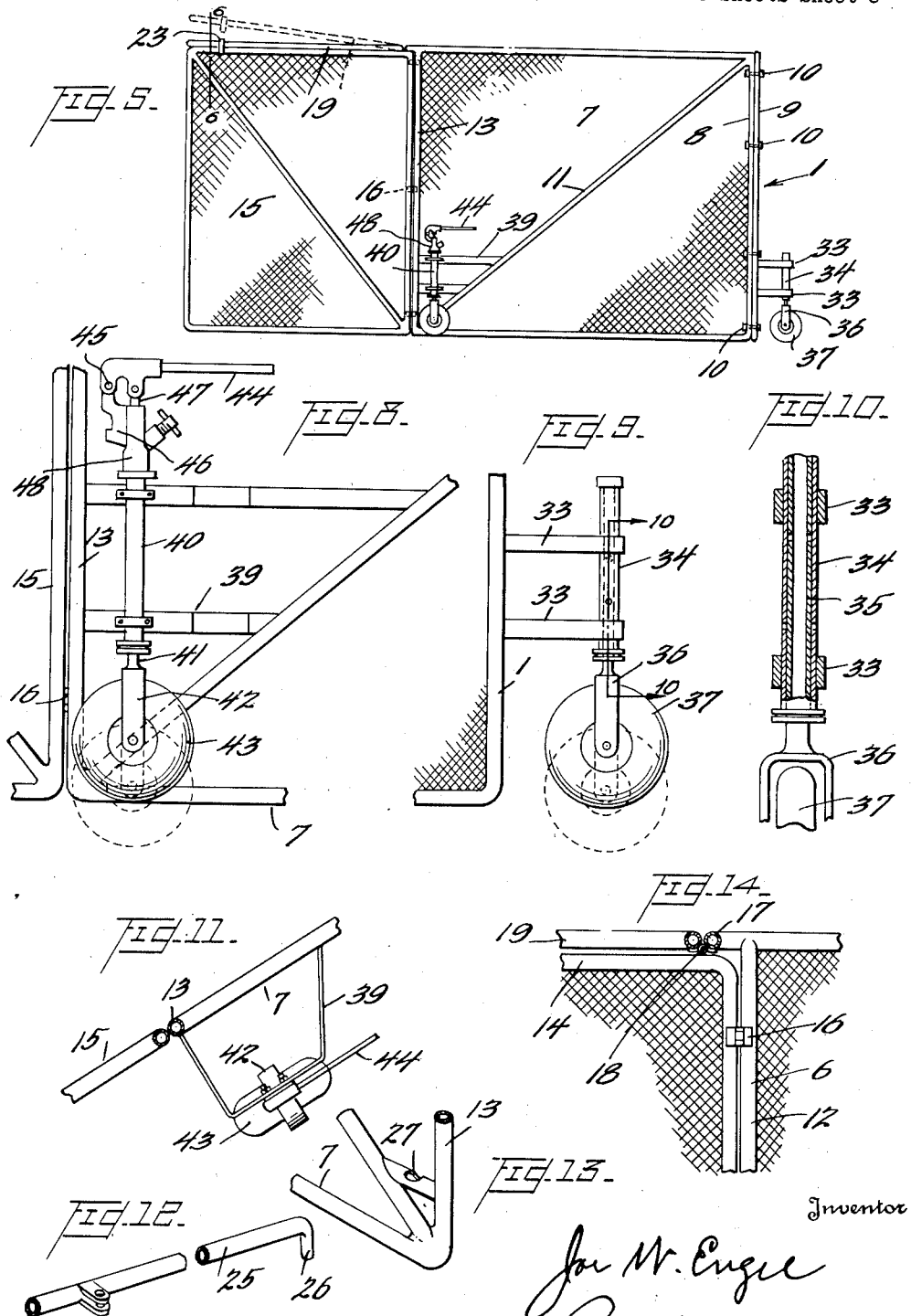

Patented Aug. 4, 1942

2,292,109

UNITED STATES PATENT OFFICE 2,292,109

BATTING CAGE

Joe W. Engel, Chattanooga, Tenn.

Application January 18, 1941, Serial No. 375,058

9 Claims. (Cl. 273—26)

My invention relates to improvements in batting cages.

The object of the invention is to provide a cage of this character made up of a series of sections removably connected together; and, at the same time, providing a rigid and strong cage, yet allowing the sections to be disconnected and assembled in stacked relation to form a comparatively compact bundle for shipment.

Another object of the invention is to provide a cage of this character, in which a portion of the top and side walls can be folded downwardly and inwardly and locked in said position, forming a comparatively small cage, in order that the same may be readily moved to and from a field.

Another object of the invention is to provide a cage of this character, in which the side walls diverge outwardly at the proper angle and a portion of the top is cut away, so that properly batted balls will pass from the cage, while other balls will strike the side walls or top of the cage.

A further object of the invention is to provide vertically adjustable wheels for raising and lowering the cage, whereby the same may be easily transported to and from a field; and, when lowered, the cage will rest solidly upon the ground.

A still further object of the invention is to provide a simple, strong and effective cage which can be cheaply manufactured and assembled, thus not requiring skilled labor.

In the accompanying drawings—

Figure 1 is a front elevation of my improved cage, in extended position, ready for use;

Figure 2 is a top plan view of Figure 1;

Figure 3 is a top plan view, showing the hinged top and side sections folded downwardly and inwardly and locked in position to be rolled on or from a field;

Figure 4 is a cross section on the line 4—4 of Figure 3, looking in the direction of the arrow;

Figure 5 is a side elevation of Figure 1, showing the hinged top section slightly raised to release the hinged side sections to allow them to be swung inwardly and downwardly;

Figure 6 is a vertical sectional view, taken on the line 6—6 Figure 5;

Figure 7 is a vertical sectional view, taken on the line 7—7 Figure 3;

Figure 8 is an enlarged side elevation of a portion of the cage, showing one of the supporting wheels with its elevating and lowering means;

Figure 9 is an enlarged side elevation of the rear supporting wheels;

Figure 10 is a vertical sectional view, taken on the line 10—10 Figure 9;

Figure 11 is a top plan view of Figure 8 showing part of the frame broken away;

Figure 12 is a perspective view of one end of the connecting bar, used for locking the hinged side sections in an inward folded position, while the cage is being rolled to or from a field;

Figure 13 is a perspective view of the outer lower end of one of the hinged side sections, showing the means of connecting the bar, shown in Figure 12, thereto;

Figure 14 is a vertical sectional view, taken on the line 14—14 Figure 2;

Figure 15 is a plan view, partly in section, of the means for connecting the bars forming the top hinged section;

Figure 16 is a sectional view of Figure 15.

Referring now to the drawings, I represents the rear section of the cage, rectangular in form, and preferably made of tubular metal secured together by couplings, electric welding, or any desired manner. Diagonal braces 2 and 3 are arranged at the upper end of the rear section for bracing the same, and the upper half is covered by netting, while the lower half is covered by heavy canvas 5. Arranged at the ends of the rear section are side sections 6 and 7, formed of a metal frame, with their rear vertical bars 8 secured to the bars 9, of the rear section 1, by means of bolts 10. These side sections diverge outwardly and are covered by a netting. Each of the side sections is provided with diagonal braces 11, to form a more rigid frame. Hinged to the vertical bars 12 and 13, of the side frames, or sections, 6 and 7, are folding side sections 14 and 15, adapted to swing outwardly in a line with the side sections 6 and 7, and the two will form continuous side sections. Ordinary leaf hinges 16 are used for connecting the sections 14 and 15 to the sections 6 and 7. The upper ends of the sections 6 and 7 are connected together by means of a transverse bar 17, whereby the side sections are held in their proper diverging relation.

The bar 17 has hinged thereto, by means of hinges 18, a top section 19. This top section is of a length to extend entirely across the space between the side sections 6 and 7, and provided with angular ends 20 and 21, and arranged in a line with the diverging walls of the side sections 6 and 7. The hinged top frame 19 is cut away at the center, as indicated at 22, to allow a properly hit ball to pass upwardly out of the cage. This top section is supported upon the upper end of the hinged side sections 14 and 15 when the same are swung outwardly, and are held thereon by means of the clips 23 and 24. These clips also hold the two hinged side sections rigidly against any movement. The hinged side sections 14 and 15 are swung inwardly and the hinged top section 19 swung downwardly, as clearly shown in Figure 4 of the drawings. While in this position, the cage is transported to or from a field. In order to rigidly hold the lower end of the side sections 6 and 7, I provide a connecting bar 25, having at its outer end a downwardly turned portion 26, adapted to enter openings 27 in the side sections 6 and 7, as clearly shown in Figures 12 and 13 of the drawings. This prevents any twisting of the side sections and also serves as means for holding the hinged side sections in their proper inwardly folded position. This is accomplished by having the bar 25 connected to the inner end of the sections 14 and 15. This connection is in the form of clips 28 and 29, having their ends 30 extending over projections 31, carried by the sections 14 and 15, as clearly shown in Figure 7 of the drawings. Bolts 32 pass through openings in the ends 30 of the clips, and also through openings in the projections 31, carried by the hinged side sections.

The rear section 1 is provided with outwardly extending brackets 33, in which is mounted a cylinder 34, provided with a piston and piston rod 35, which carries at its lower end a yoke 36, in which is rotatably mounted the wheel 37. The outer ends of the side sections 6 and 7 are provided with brackets 38 and 39; which, like the brackets 33, support a cylinder 40, carrying a piston provided with a piston rod 41, to which is connected the yoke 42, and in which is freely and rotatably mounted the wheel 43. A hand lever 44 is pivotally connected at 45 to a bracket 46, carried by the side wall of the cylinder 40. Pivotally connected to the hand lever 44 is a pump rod 47, whereby air can be forced into the cylinder 40 for moving the piston rod downwardly to cause the wheels 43 to engage the ground and raise the cage from the ground, so that it can be moved. In order to lower the cage, when it has been placed in its proper position, a relief valve 48 is arranged in the upper end of the cylinder so that the air can escape therefrom and the piston rod 41 moved upwardly, due to the weight of the cage on the wheels 43.

The cage, when not in use, is normally folded in the position shown in Figures 3 and 4 of the drawings. The brace bar 25 rigidly holds the side sections against movement and also the hinged side sections 14 and 15, as heretofore fully described. When in this position, the cage has been lowered on the ground, in order to relieve the wheels of the weight thereof, and to prevent the moving of the cage. When it is desired to use the cage, the hand lever of each of the cylinders is reciprocating, forcing air into the cylinders 40, causing the piston 41 to move downwardly and the wheels will engage the ground and the continued downward movement of the piston rod will raise the cage from the ground the desired height. After all of the wheels have been forced down, it will be understood that the lower end of the cage is free from the ground and can be rolled to any desired place. When the cage has been placed in the proper position for use, the relief valves 48 are opened, allowing the piston rods 41 to move upwardly to lower the cage on the ground. The pins 32 are removed and the brace bar 25 wholly removed. The top section 19 is raised to the position shown in Figure 5 of the drawings, and the hinged side sections 14 and 15 are swung outwardly until they assume the position in line with the side sections 6 and 7, when the top section 19 is lowered, so that the clips 23 and 24 pass over the top bars of the hinged sections to properly hold the top and side sections.

While I have shown the specific construction of the several sections and the raising means for the cage, it will be understood that the same could be varied without departing from my invention.

What I claim is:

1. A batting cage, comprising a frame composed of a rear section and diverging side sections, netting covering the top, the rear section and the diverging side sections, means for connecting the upper outer ends of the dieverging side sections, side sections hinged to the outer ends of the diverging side sections, and a top section hinged to the connecting means of the diverging side sections and adapted to be supported upon the upper ends of the outer side sections.

2. A batting cage, comprising a frame composed of a rear section and diverging side sections, netting covering the top, the rear section and the diverging side sections, a transverse bar connecting the upper outer ends of the diverging side sections, side sections hinged to the outer ends of the diverging side sections and forming a continuation thereof, and a top section hinged to the transverse bar connecting the diverging side sections and adapted to be supported upon the upper ends of the outer side sections.

3. A batting cage, comprising a frame composed of a rear section and diverging side sections, netting covering the top, the rear section and the diverging side sections, a transverse bar connecting the upper outer ends of the diverging side sections, side sections hinged to the outer ends of the diverging side sections and forming a continuation thereof, a top section hinged to the transverse bar connecting the diverging side sections and adapted to be supported upon the upper ends of the outer side sections, and means carried by the hinged top section to prevent the swinging of the hinged side sections.

4. A batting cage, comprising a frame composed of a rear section and diverging side sections, netting covering the top, the rear section and the diverging side sections, a transverse bar connected to the outer upper ends of the diverging side sections, side sections hinged to the outer ends of the diverging side sections and forming a continuation thereof, and a top section having a diverging central cutout portion hinged to the transverse bar connecting the diverging side sections and adapted to be supported upon the upper ends of the outer side sections.

5. A batting cage, comprising a frame composed of a rear section and diverging side sections, netting covering the top, the rear section and the diverging side sections, a wheel carried by each of said sections, means for raising and lowering said wheels to raise and lower the cage, side sections hinged to the outer ends of the diverging side sections and forming a continuation thereof, a top section hinged to and supported by the side sections and adapted to be supported in a horizontal position upon the outer ends of the outer side sections.

6. A batting cage, comprising a frame composed of a rear section and diverging side sections covered by netting, a netting forming the top connected to the upper ends of the rear section and the diverging side sections, a transverse bar connecting the upper ends of the diverging side sections and connected to the top netting, side sections hinged to the outer ends of the diverging side sections and forming a continuation thereof, and a top section hinged to the transverse bar connecting the diverging side sections and adapted to be supported upon the upper ends of the outer side sections, and latching means carried by the hinged top section and engaging the hinged side sections for holding the same in their proper positions.

7. A batting cage, comprising a frame composed of a rear section and diverging side sections covered by a netting, a wheel carried by each of said sections, means for raising and lowering said wheels, to raise and lower the cage, a netting forming a top secured to the rear section and the diverging side sections, a transverse bar connected to the outer upper ends of the diverging side sections, side sections hinged to the outer ends of the diverging side sections and forming a continuation thereof, and a top section having a diverging central cut out portion hinged to the transverse bar connecting the diverging side sections and out beyond the hinged side sections and supported upon and locked to the upper ends of the outer side sections.

8. A batting cage, comprising a frame composed of a rear section having its lower end covered with canvas and its upper end with netting, diverging side sections rigidly carried by the rear section, means for connecting the upper outer ends of the diverging side sections, a netting forming a top secured to the upper ends of the rear section and the diverging side sections and the connecting means, side sections hinged to the outer ends of the diverging side sections, and a top section hinged to the connecting means of the diverging side sections and adapted to be supported upon the upper ends of the outer side sections.

9. A batting cage, comprising a frame composed of a rear section and diverging side sections rigidly connected, netting covering the top, the rear section and the diverging side sections, a transverse bar connecting the upper and outer ends of the diverging side sections, side sections hinged to the outer ends of the diverging side sections and forming a continuation thereof, a top section hinged to the transverse bar connecting the diverging side sections, wheels carried by the rear and diverging side sections, a removable brace bar connecting the lower outer ends of the diverging side sections, and means for locking the hinged side sections to the brace bar when folded inwardly, whereby the cage may be rigidly held while being moved.

JOE W. ENGEL.